United States Patent [19]
Olbermann, Jr.

[11] 3,752,222
[45] Aug. 14, 1973

[54] TRANSMISSION OIL COOLING SYSTEM
[76] Inventor: John H. Olbermann, Jr., 19 Thunderbird Park, Sierra Vista, Ariz. 85635
[22] Filed: Nov. 18, 1971
[21] Appl. No.: 200,111

[52] U.S. Cl. .................................... 165/35, 165/51
[51] Int. Cl. ............................................ G05d 23/00
[58] Field of Search .................. 165/35, 36, 37, 38, 165/17

[56] References Cited
UNITED STATES PATENTS
2,670,933  3/1954  Bay ...................................... 165/35
3,353,590  11/1967  Holman ............................... 165/35

Primary Examiner—Charles Sukalo
Attorney—Merle J. Smith

[57] ABSTRACT

A transmission oil cooling system is improved by a thermostatically controlled bypass valve in the line transferring transmission oil to the oil cooling system whereby the oil flows to the cooling system when the oil is at the desired operating temperature and the valve is opened by the thermostat, but the oil is directed to the return line when below operating temperature and the valve is closed by the thermostat.

2 Claims, 4 Drawing Figures

TRANSMISSION OIL COOLING SYSTEM

BACKGROUND OF THE INVENTION

The transmissions of many modern cars and trucks employ torque converters. Heat produced by the torque converter on the oil used to transmit power must be dispersed. A conventional method involves pumping the transmission oil through lines into a separate tube of the radiator, where some of the heat is absorbed by the engine coolant in an adjoining section of the radiator. The transmission oil cooling tube is inside the radiator but no oil gets into the coolant.

This arrangement is not particularly efficient and transmission overheating can contribute considerably to engine overheating by adding to the heat load which the radiator must handle from the engine. The addition of the popular trailer which is towed behind cars and trucks particularly increases this and other problems resulting in the so-called "trailer packages" installed in vehicles used for trailer hauling.

Widespread use of transmission oil coolers has been adopted as a solution to the problem. One popular type of installation is the addition of a transmission cooler in series with the conventional radiator connection. The transmission oil first is circulated through the conventional radiator and then through an auxiliary cooler before returning to the transmission.

This type of installation is also not without its problems. Optimum temperatures for transmission oil operation range between about 175° and 225°. Excessively low temperatures are as undesirable as too high temperatures because they result in poor oil circulation, poor transmission performance and accelerated wear. A temperature in the desired range is slowly attained on start up with the additional cooling supplied by the auxiliary cooler. In cold weather, warm up is slow and the oil temperature may even drop below optimum operating temperature and stay there. In fact, disconnection of the auxiliary cooler is recommended in cold weather.

SUMMARY OF THE INVENTION

This invention relates to an improved transmission oil cooling system. It is an object of this invention to overcome the problems associated with transmission oil overheating, and underheating, especially when an auxiliary transmission oil cooler is employed.

The invention comprises incorporating a thermostatic control and by pass housing in the lines carrying transmission oil to the cooling system. The bypass unit is inserted in the take-off line from the transmission. When the temperature of the transmission oil is within the desired operating range, the sensing mechanism opens a valve and the oil flows through the housing into the line to the cooling system. When the temperature of the oil is below the set range, the valve closes and the oil is bypassed into the return line for immediate recirculation to the transmission.

DETAILED DESCRIPTION OF THE INVENTION

Figure 1:
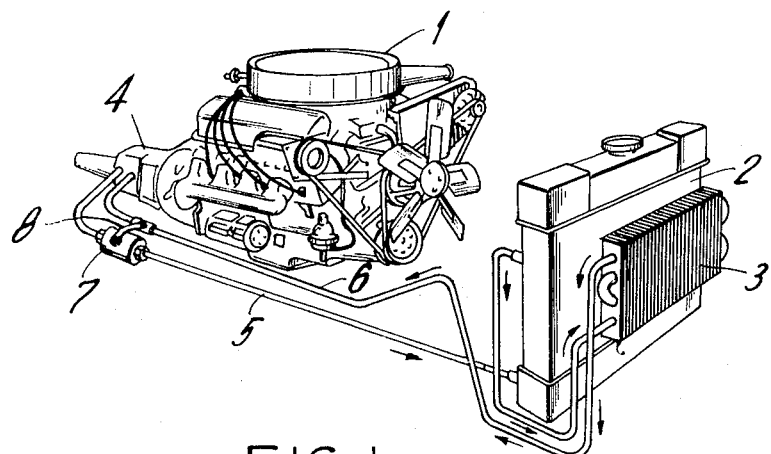
FIG. 1 is a diagrammatic view showing the engine, transmission and cooling system in relation to each other and the placement of the thermostatic control and bypass housing in the system.

FIG. 1 shows the placement of the bypass housing and thermostatic valve of this invention in the transmission oil cooling lines. In FIG. 1 is shown engine 1 with radiator 2 and a front mounted auxiliary cooler 3. There is greater than actual separation between engine and radiator in the drawing for purpose of clarity. Line 5 carries oil from transmission 4 to the cooling system. The oil from the transmission passes first through the oil cooling section of radiator 2, then through auxiliary oil cooler 3, the cooled oil returning to the transmission via return line 6.

Take-off line 5 is tapped and bypass housing 7 is inserted in line 5 by tapped or threaded fittings 17 and 18 at each end of the bypass housing. The size of the bypass housing is somewhat exaggerated in FIG. 1 in proportion to the engine for purposes of clarity. A separate fitting 16 is provided laterally on the bypass housing from which bypass line 8 connects to return line 6 by a tee inserted in that line.

Figure 2:
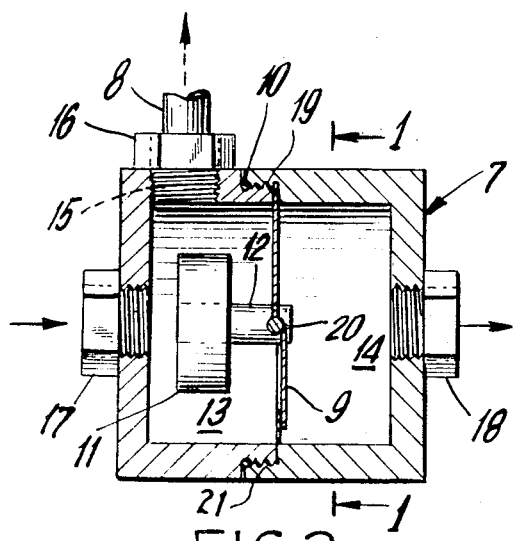
FIG. 2 is a cross sectional view of the bypass housing and thermostatic valve in elevation.
Figure 3:
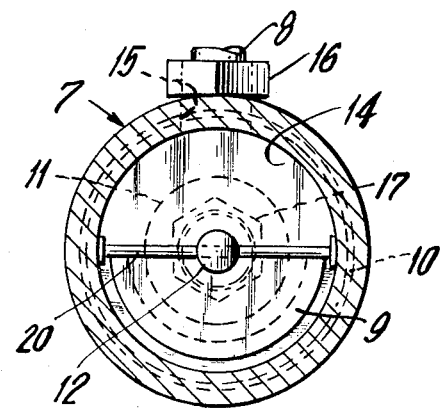
FIG. 3 is a cross sectional view along the plane 1—1 of FIG. 2 in the direction of the arrows.
Figure 4:
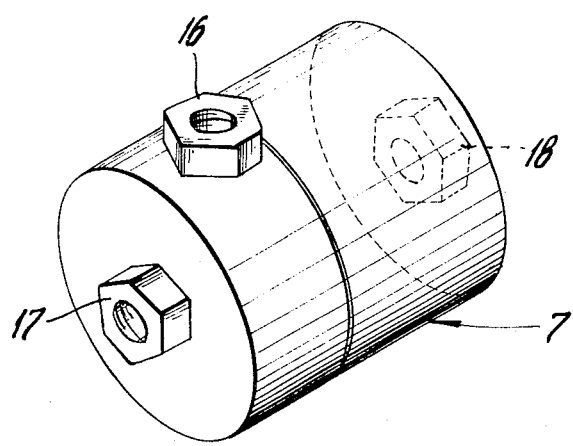
FIG. 4 is a rendering of the exterior of the unit.

The bypass housing and thermostatically controlled valve is shown in FIG. 2. The bypass housing is preferably two-piece, joined by threads 21. The solid arrows show the direction of oil flow when the valve is open and the dotted arrow shows the direction of oil flow when the valve is closed.

Valve 9, operating about hinge 20, is shown in the closed position seated between the machined flange 19 in the female part of the housing and the beginning of the threads on the male part of the housing. The valve is actuated through rod 12 by thermostat 11 which is placed directly in the line of oil flow entering the bypass housing from the transmission. "O" ring 10 seals the two parts of the housing only. According to one modification, fitting 16 is tapped or machined for connection to a conventional check valve (not shown) of the ball or disc type. Thermostat 11 normally maintains valve 9 in the closed position by means of rod 12, as shown in FIG. 1. This seals the cross sectional opening and prevents fluid from entering chamber 14. The thermostat is of the conventional automative cooling system (fail open) brass type incorporating a butterfly or poppet type valve actuated by a heat sensitive bulb or disc and opening at a temperature of about 180°.

In operation, transmission oil is forced into takeoff line 5 and enters chamber 13 of bypass valve housing 7 completely engulfing the actuating mechanism of thermostat 11. As long as the oil in chamber 13 is below the desired minimum operating temperature, the thermostat retains valve 9 in the closed position and prevents the oil from entering chamber 14 and continuing its course through line 5 into the cooling system. The transmission oil is diverted instead through port 15 and line 8 where it returns to the transmission through line 6.

When the operation of the transmission heats the oil to operating temperature, the thermostat actuates valve 9 and opens the passage to chamber 14. The transmission oil then continues on into line 5 through radiator 2, auxiliary cooler 3 and the cooled oil returns to the transmission through line 6 as shown by directional arrows in FIG. 1.

The thermostatic control of the transmission oil in this manner provides a quick warm up and avoids initial "stiffness." Yet the advantages of the auxiliary cooler in preventing overheating are retained. In cold weather it aids in preventing operation at too low temperatures because of excessive cooling thus avoiding sluggish operation of the transmission and increased wear.

What is claimed is:

1. A cooling system for cooling torque converter transmission oil comprising a transmission, a torque converter utilizing transmission oil as a driving means, a heat exchange system for cooling said transmission oil comprising in series a radiator containing said oil in heat exchange relationship with air and engine cooling fluid and an auxiliary for said oil, an oil transfer line from said transmission and torque converter to the inlet of said heat exchange system, an oil return line from the outlet of said heat exchange system, a bypass housing in said oil transfer line containing a bypass valve activated by a thermostat on the inlet side to be open at about 180° and above, said oil flowing through said housing, take-off line and cooling system and returning to the transmission in said temperature range, and said oil being diverted through a bypass line from said inlet side directly to said return line and transmission below said temperature range.

2. A system as in claim 1 wherein there is a check valve in the bypass line.

* * * * *

PO-1050
(5/69)

UNITED STATES PATENT OFFICE
CERTIFICATE OF CORRECTION

Patent No. 3,752,222                       Dated August 14, 1973

Inventor(s)   John H. Olbermann, Jr.

It is certified that error appears in the above-identified patent and that said Letters Patent are hereby corrected as shown below:

Claim 1, line 7, after-- auxiliary-- insert "cooler"

Signed and sealed this 20th day of November 1973.

(SEAL)
Attest:

EDWARD M. FLETCHER, JR.           RENE D. TEGTMEYER
Attesting Officer                 Acting Commissioner of Patents